United States Patent
Singh

(10) Patent No.: US 9,407,450 B2
(45) Date of Patent: Aug. 2, 2016

(54) METHOD AND APPARATUS FOR PROVIDING TENANT INFORMATION FOR NETWORK FLOWS

(75) Inventor: Akshya Kumar Singh, Fremont, CA (US)

(73) Assignee: Cisco Technnology, Inc., San Jose, CA (US)

( * ) Notice: Subject to any disclaimer, the term of this patent is extended or adjusted under 35 U.S.C. 154(b) by 507 days.

(21) Appl. No.: 13/461,667

(22) Filed: May 1, 2012

(65) Prior Publication Data

US 2013/0297768 A1     Nov. 7, 2013

(51) Int. Cl.
    *G06F 15/173*     (2006.01)
    *H04L 12/26*     (2006.01)

(52) U.S. Cl.
    CPC .................................. *H04L 12/2602* (2013.01)

(58) Field of Classification Search
None
See application file for complete search history.

(56) References Cited

U.S. PATENT DOCUMENTS

| | | |
|---|---|---|
| 7,636,305 B1 | 12/2009 | Taylor et al. |
| 7,787,379 B2 | 8/2010 | Mekkattuparamban et al. |
| 2008/0250153 A1 | 10/2008 | Claise et al. |
| 2010/0188976 A1 * | 7/2010 | Rahman ............... H04L 47/10 370/235 |
| 2011/0261828 A1 | 10/2011 | Smith |

OTHER PUBLICATIONS

Claise, Cisco Systems NetFlow Services Export Version 9. Oct. 2004. Network Working Group. RFC 3954. All Pages.*
The Authoritative Dictionary of IEEE Standards Terms, published 2000, seventh edition, p. 226.*
Mahalingam et al, VXLAN: A Framework for Overlaying Virtualized Layer 2 Networks over Layer 3 Networks. Aug. 26, 2011. Network Working Group. All Pages.*
Sanjay Agrawal et al:"A framework to extend network infrastructure services to virtual data centers"IP.COM Journal,NY,US,Feb. 1, 2012,ISSN: 1533-0001.
Hui-Min Tseng et al:"Network virtualization with cloud virtual switch",ICPADS,2011 IEEE 17th Intl Conference,IEEE,Dec. 7, 2011, pp. 998-1003,ISBN: 978-1-4577-1875-5.
IETF RFE 5101, "Specification of the IP Flow Information Export (IPFIX) Protocol for the Exchange of IP Traffic Flow Information", B. Claise, Jan. 2008.
IETF RFC 3954 , "Cisco Systems NetFlow Services Export Version 9", B. Claise, Oct. 2004.

* cited by examiner

*Primary Examiner* — Mohamed Wasel
*Assistant Examiner* — Tsung Wu
(74) *Attorney, Agent, or Firm* — Cindy Kaplan

(57) ABSTRACT

In one embodiment, a method includes generating at a network device comprising a virtual switch, a tenant record comprising tenant information for a context defined within the virtual switch, exporting the tenant record to a collector, monitoring network flow at the virtual switch, and exporting network flow data in a data record to the collector. The data record includes an identifier associating the data record with the context. An apparatus is also disclosed.

20 Claims, 4 Drawing Sheets

METHOD AND APPARATUS FOR PROVIDING TENANT INFORMATION FOR NETWORK FLOWS

TECHNICAL FIELD

The present disclosure relates generally to communication networks, and more particularly, to providing tenant information in a cloud computing multi-tenant environment.

BACKGROUND

Many enterprise and service provider customers are building private or public clouds. Cloud computing enables network access to a shared pool of configurable resources that can be rapidly provisioned and released with minimum management effort. In a multi-tenant model, a provider's resources are pooled to serve multiple customers, with different physical and virtual resources dynamically assigned and reassigned according to customer demand. In cloud computing, a multi-tenant environment allows multiple customers to use the same public cloud. In order to provide network planning and security analysis in a multi-tenant environment, traffic needs to be monitored on a per tenant basis and data needs to be exported for each tenant.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
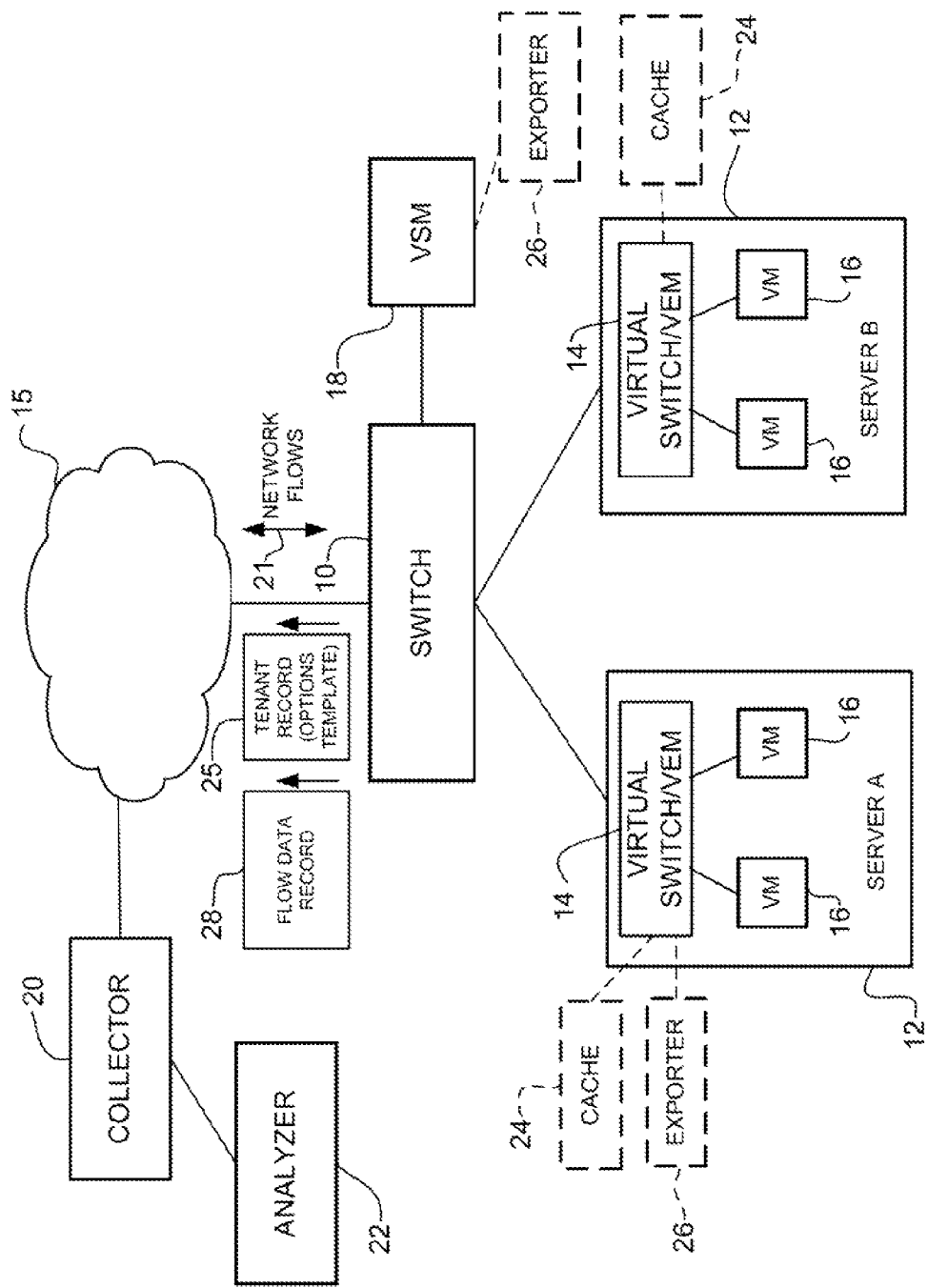
FIG. 1 illustrates an example of a network in which embodiments described herein may be implemented.

In one embodiment, a method generally comprises generating at a network device comprising a virtual switch, a tenant record comprising tenant information for a context defined within the virtual switch, exporting the tenant record to a collector, monitoring network flow at the virtual switch, and exporting network flow data in a data record to the collector. The data record includes an identifier associating the data record with the context.

In another embodiment, an apparatus generally comprises a processor for generating a tenant record comprising tenant information for a context defined within a virtual switch, exporting the tenant record to a collector, monitoring network flow at the virtual switch, and exporting network flow data in a data record to the collector. The data record comprises an identifier associating the data record with the context. The apparatus further includes memory for storing tenant information.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Cloud computing provides resources and services that are abstracted from an underlying infrastructure and provided on demand and at scale. Intrinsic to cloud computing is the presence of multiple tenants with numerous applications using the on-demand cloud infrastructure. Support for multi-tenancy has become an important requirement for data centers, especially in the context of data centers supporting virtualized servers, referred to as virtual machines. Multiple virtual machines share hardware resources without interfering with each other so that several operating systems and applications can be run at the same time on a single computer.

Within the cloud environment, each of the tenants and applications needs to be logically isolated from one another, even at the network level. Traffic isolation is important in a multi-tenant implementation so that a tenant's traffic and internal address usage is not visible to other tenants and does not collide with addresses used within the data center. Conventional virtual local area network isolation techniques may not provide enough segments for large cloud deployments. In order to provide segmentation at cloud-deployment scale, Virtual eXtensible Local Area Network (VXLAN) may be used to provide network virtualization overlays. Traffic within a network may be separated among multiple customers based on a constant such as segmentation identifier (in the case of VXLAN) or VLAN identifier.

Each network flow in a large scale server deployment is preferably tracked in order to monitor appropriate services to an identified connection or flow. A network protocol such as NetFlow may be used to collect traffic (network flow) information. NetFlow services provide network administrators with access to information concerning IP (Internet Protocol) flows within their data networks. Exported NetFlow data can be used for a variety of purposes, including, for example, network management and planning, enterprise accounting, Internet Service Provider (ISP) billing, data warehousing, preventing Denial of Service (DoS) attacks, and data mining. In order to enable NetFlow in a multi-tenant environment, the traffic needs to be monitored and exported on a per tenant basis. NetFlow collectors should also represent the data on a per tenant basis. The NetFlow collectors thus need information about a tenant associated with the VXLAN segment or other context within a virtualized environment.

The embodiments described herein allow for the monitoring of traffic on a per tenant basis and the exporting of traffic information (e.g., NetFlow data) on a per tenant basis. As described below, the traffic is separated among multiple customers using a context defined with a virtual switch environment. In one embodiment, a tenant record (e.g., options template) is used to export tenant specific information based on a virtual local area network segment identifier (e.g., VXLAN segmentation ID) or other constant. The tenant record provides detailed information about the tenant associated with the context and is exported to a collector for use in identifying the tenant associated with flow data records received at the collector. As tenant information does not change very often, the tenant record eliminates the need to include tenant information in every flow data record.

Referring now to the drawings, and first to FIG. 1, an example of a network in which embodiments described herein may be implemented is shown. For simplification, only a small number of network elements are depicted. The network may be configured for use as a data center or any other type of network. As shown in FIG. 1, a physical switch 10 is in communication with network devices (server A, server B) 12 and a network 15. The switch 10 may be, for example, an access switch in communication with an aggregation switch or edge switch (not shown). There may be any number of physical switches 10 located between the servers 12 and network 15. For example, there may be multiple switches 10 to provide redundancy for traffic flow between the servers 12 and network 15. The network 15 may include one or more networks (e.g., local area network, metropolitan area network, wide area network, virtual private network, enterprise network, Internet, intranet, radio access network, public switched network, or any other network). The network 15 may include any number or type of network devices (e.g., routers, switches, gateways, or other network devices), which facilitate passage of data over the network.

Each server 12 includes a virtual switch (referred to herein as a Virtual Ethernet Module (VEM)) 14 and one or more virtual machines (VMs) 16. The virtual machines 16 share hardware resources without interfering with each other, thus enabling multiple operating systems and applications to execute at the same time on a single computer. A virtual machine monitor such as hypervisor (not shown) dynamically allocates hardware resources to the virtual machines 16. Each server 12 may include any number of virtual machines 16 and the virtual machines may be moved between servers based on traffic patterns, hardware resources, or other criteria. The server 12 may be, for example, a blade server, rack server, or any other type of network device operable to host virtual machines 16. The servers 12 may, for example, host application servers or remotely hosted virtual machine applications for use at end user equipment (end stations, client devices) (not shown).

The virtual machines 16 are in communication with the virtual switch 14 via virtual network interface cards (VNICs) which connect to a virtual Ethernet interface at the virtual switch. The server 12 includes an Ethernet port for each physical network interface card. The Ethernet ports may be aggregated at a port channel. The virtual switches 14 are in communication with the network 15 via the physical Ethernet interfaces. The virtual switch 14 switches traffic between the virtual machines 16 and the physical network interface cards.

The physical switch 10 is also in communication with a Virtual Supervisor Module (VSM) 18. The VSM 18 may be located in a physical appliance in communication with the servers 12 via physical switch 10 or the VSM may be a virtual appliance (e.g., virtual machine) installed at one of the servers 12 or another server in the network. The VSM 18 is configured to provide control plane functionality for the virtual machines 16. The virtual switch 14 provides switching capability at the server 12 and operates as a data plane associated with the control plane of the VSM 18. The VSM 18 and virtual switch (VEM) 14 operate together to form a distributed virtual switch (DVS) as viewed by a management station (not shown). The distributed virtual switch may be, for example, a Nexus 1000V series switch available from Cisco Systems, Inc. of San Jose, Calif. The management station may comprise, for example, a virtualization management platform such as VMware Virtual Center management station, available from VMware of Palo Alto, Calif.

It is to be understood that the distributed virtual switch shown in FIG. 1 and described above is only an example, and the embodiments described herein may be implemented in other virtual switches. The term 'virtual switch' as used herein may refer to a distributed virtual switch (e.g., VEMs 14 and VSM 18) or other virtual switch operable to switch traffic between a network device (e.g., physical switch, router, gateway) and virtual machines at a server or other network device in a virtualized server environment.

As shown in FIG. 1, network flows 21 are exchanged between user equipment and the servers 12 over network 15. The flow 21 comprises a sequence of packets with common properties that pass through network device 12. The flow may be defined, for example, based on source IP address, destination IP address, IP protocol, source port, and destination port. Each of the individual flows may be monitored and statistics maintained on each flow (e.g., flow start and end times, number of packets sent, etc.).

The flow is monitored by the VEM 14 at each server 12 and stored at a cache (e.g., NetFlow cache) 24 at the servers. Each processing line card supporting a VEM 14 at the server 12 collects flow statistics for flows passing through the line card. As described below, flow data may be exported directly from each VEM 14 using a distributed exporter model, or the VEMs 14 may transmit the data accumulated in their caches 24 to the VSM 18 and the flow data exported by the VSM using a single source exporter model.

In the distributed exporter model, the exporters 26 are located at the VEMs 14 (as shown at server A in FIG. 1). Each line card supporting the VEM 14 exports is own cache 24 directly to a collector 20, with only limited supervisor functions for the export provided by the VSM 18.

In the single source exporter model, flow statistics are stored at cache 24 at the VEMs 14 and transmitted to the exporter 26 at the VSM 18 (shown at server B and VSM in FIG. 1). When it is time to export the flow statistics, data is routed from the VEMs 14 to the VSM 18. Flow data is then exported from the VSM 18 to the collector 20.

The exporter 26 transmits export packets to the collector 20. As described in detail below, the export packets include tenant records (e.g., templates, options templates) 25 and flow data records 28. The tenant record 25 includes tenant information for a context (e.g., virtual local area network segment (VXLAN)) defined within the virtual switch (e.g., distributed virtual switch, multiple distributed virtual switches).

The tenant record 25 may be exported to the collector 20 at the beginning of the flow, periodically, on demand, or any combination thereof. For example, the tenant record 25 may be exported after a specified number of packets or time period. The interval may be a default value or may be configurable.

Export of tenant records 25 and data records 28 to the collector 20 may be made using User Datagram Protocol (UDP) or Stream Control Transmission Protocol (SCTP) as the transport mechanism, for example.

The collector (data collection device) 20 receives data (tenant records 25, flow data records 28) from one or more exporters 26 and processes the data. The collector 20 receives and stores the tenant records 25 and flow data records 28. The flow records 28 may be aggregated (e.g., according to tenant) before being stored at the collector 20. Once the tenant record 25 is received by the collector 20, the segment ID (or other identifier) is used by the collector to map traffic information received from the exporter 26 to a specific tenant. For example, the collector 20 may use the information received in in the tenant record 25 to decode the flow data records 28 and map the data records to a tenant. Flow statistics exported by the exporter 26 to the collector 20 are analyzed by an analyzer 22. The analyzer 22 may process the network flow information for use by applications such as usage-based accounting, traffic engineering, attack/intrusion detection, quality of service monitoring, etc. The analyzed statistics can be used by a network administrator to provide information on network volume and flow, and for use in resolving any network deficiencies.

In one embodiment, the cache 24, exporter 26, and collector 20 are a NetFlow cache, NetFlow exporter, and NetFlow collector, respectively. The term 'NetFlow' as used herein refers to a protocol used to monitor characteristics of network flows. It is to be understood that this is only an example and that other protocols such as Internet Protocol Flow Information eXport (IPFIX) may be used to collect traffic information and monitor characteristics of network flows. Any number or type of exporters 26, collectors 20, or analyzers 22 may be used. Also, the collector 20 and analyzer 22 may be located at the same network device.

It is to be understood that the network shown in FIG. 1 and described herein is only an example and that the embodiments may be implemented in networks having different network topologies or network devices, without departing from the scope of the embodiments.

As noted above, the example illustrated in FIG. 1 includes a small number of network elements. An infrastructure for a service cloud computing environment can have a large number of tenants, each with its own applications. Each tenant needs a logical network isolated from all other tenants. Each application from a tenant may also need its own logical network to isolate it from other applications. In one embodiment, VXLAN segments are used to allow logical networks to be extended among virtual machines placed in different Layer 2 domains. VXLAN provides a Layer 2 overlay scheme over a Layer 3 network. Each overly is referred to as a VXLAN segment. Only virtual machines 16 within the same VXLAN segment can communicate with each other. VXLAN provides a Layer 2 abstraction to virtual machines 16, independent of where they are located. The VXLAN segment is thus a VXLAN Layer 2 overlay network over which the virtual machines 16 communicate.

In one embodiment, each virtual machine 16 is assigned an IP address, which is used as the source IP address when encapsulating MAC (Media Access Control) frames to be sent on the network 15. The VEM 14 encapsulates a Layer 2 frame received from the virtual machine 16. The encapsulation carries the VXLAN identifier. The connected VXLAN may be specified within a port profile (described below) and applied when the virtual machine 16 connects to the network.

Figure 2:
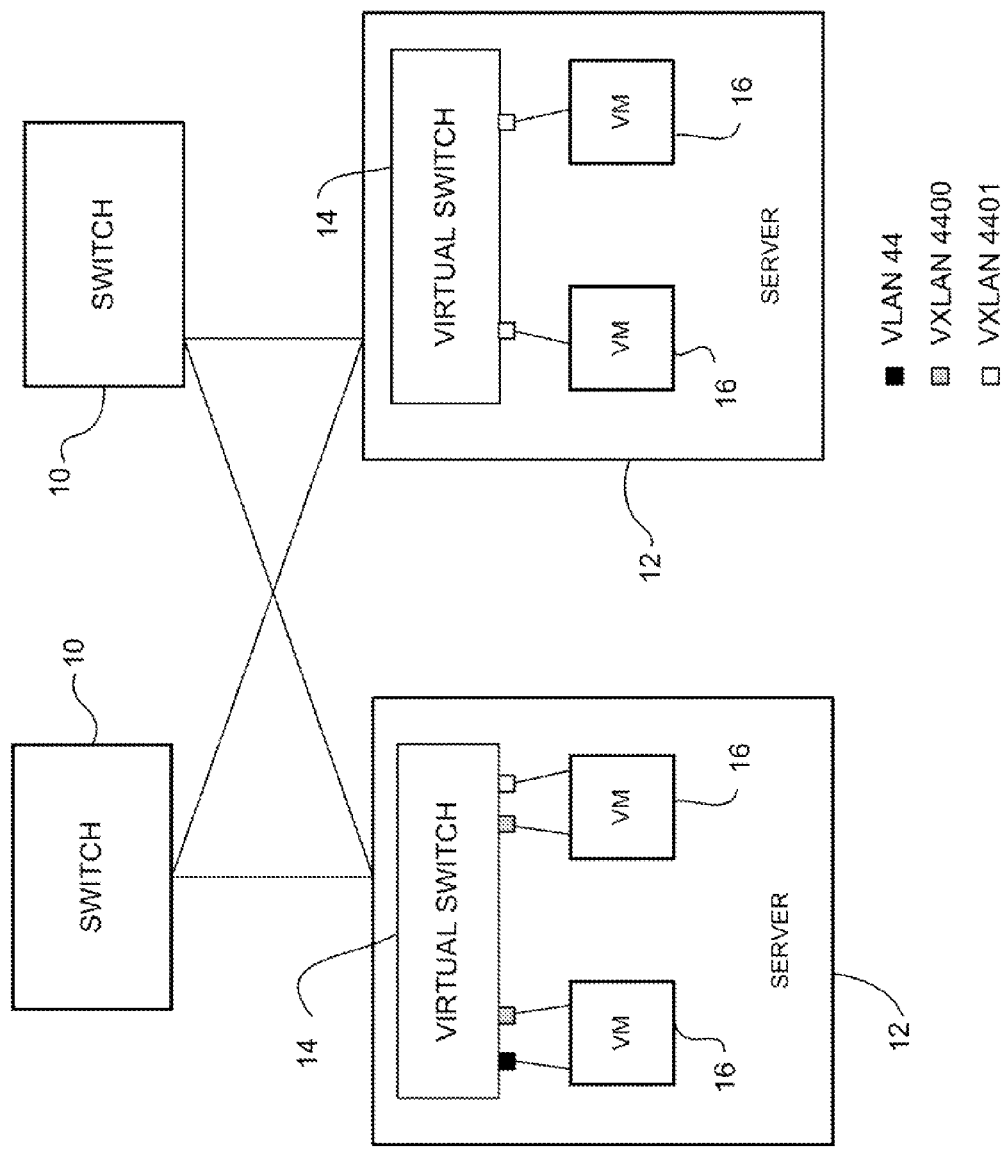
FIG. 2 illustrates virtual local area network segments for use in creating network virtualization overlays.

The same VXLAN may be configured on one or more distributed virtual switch to create network virtualization overlays. Thus, there may be a plurality of servers 12 supporting a plurality of virtual machines 16 comprising one or more interfaces each associated with a virtual local area network or a virtual local area network segment (as illustrated in FIG. 2 and described below) at different network locations. For example, clients or business units (e.g., research and development, corporate, finance) may be assigned different VXLAN segments, which are used at various locations (e.g., Los Angeles branch, San Francisco headquarters, Seattle branch) in communication with a data center. The tenant record 25 is used to provide detailed information about a tenant related to a VXLAN segment. This allows the collector 20 to represent flow data on a per tenant basis.

FIG. 2 illustrates VXLAN segments at the virtual switch 14 for use in network virtualization overlays. In the example shown in FIG. 2, the virtual machines 16 include interfaces associated with VLAN 44, VXLAN 4400, and VXLAN 4401. The clients or applications which use different segments are isolated from one another. For example, a client using the virtual machine 16 with interfaces on VLAN 44 and VXLAN 4400 does not have direct access to a server at the virtual machine with an interface on VXLAN 4401.

It is to be understood that the virtual local area network segment technology described above is only an example and that the tenant may be associated with another context defined within the virtual switch environment.

Referring again to FIG. 1, the exporter 26 at the distributed virtual switch (e.g., at the VEMs 14 or VSM 18) exports tenant records 25 which are used to provide tenant specific information based on a context identifier (e.g., segmentation ID for VXLAN or other constant). After the tenant record 25 has been sent to the collector 20, the exporter 26 sends traffic information in flow data records 28. The flow data record 28 includes flow statistics and the context ID associated with the flow. The collector 20 uses the information obtained in the tenant record 25 to map the flow record to a specific tenant.

As described below, the tenant record 25 includes an identifier (e.g., VXLAN ID (24-bit LAN segment identifier), VLAN ID, or other context ID), which is also included in the flow data record 28 to map the flow data to a specific tenant. In one embodiment, the identifier is defined in a port profile. A port profile is a container used to define a common set of configuration policies (attributes) for multiple interfaces. The port profiles are associated with port configuration policies defined by the network administrator and applied automatically to a large number of ports as they come online in a virtual environment. The port profiles allow a single policy or identifier to be applied across a large number of ports and support static and dynamic mapping to ports.

The tenant record 25 may include, for example, a segment ID, tenant name and description, location, distributed virtual switch identifier (name, location), and bridge domain. The tenant record 25 may also be used to provide additional information such as details on interface indexes (e.g., interface name, interface description) or define a data format for one or more of the data records that are sent for a flow. Different tenant records 25 are preferably generated for different context. For example, each tenant record 25 may be associated with a different VXLAN segment. The tenant record 25 may be transmitted, for example, in a NetFlow packet comprising a packet header and one or more fields comprising one or more tenant records. The packet may also comprise one or more flow data records 28.

In one embodiment the tenant record 25 is a NetFlow template or options template. It is to be understood that the term 'template' as used herein may refer to any data set (e.g., data within one or more packet fields) that may be transmitted from the exporter 26 to the collector 20 to provide tenant specific information and may be transmitted in any suitable format.

The flow data records 28 may be exported when it is determined that the flow is finished or at periodic intervals. The flow record 28 comprises information about traffic in a given flow, including, for example, measured properties of the flow, such as packet and byte counts (e.g., total number of bytes for all the flow's packets), timestamps, and characteristic properties of the flow (e.g., source IP address, protocol, Type of Service, application ports, input and output interfaces). More specifically, the flow data record 28 may include, for example, the context identifier, input interface index, output interface index, timestamps for flow start and finish times, number of bytes and packets observed in the flow, Layer 3 headers (source and destination IP addresses, source and destination port numbers, IP protocol), and Layer 3 routing information.

In one embodiment, the tenant records 25 and flow data records 28 are exported in NetFlow export packets. The export packet includes a packet header comprising packet information and one or more tenant record 25, one or more data record 28, or a combination thereof. For example, the export packet may include a collection of tenant records 28 or a collection of flow records 25 (referred to as a flowset).

It is to be understood that the contents and format of the tenant record 25 and flow data record 28 described above are only examples and that the records may contain more, less, or different information, without departing from the scope of the embodiments.

Figure 3:
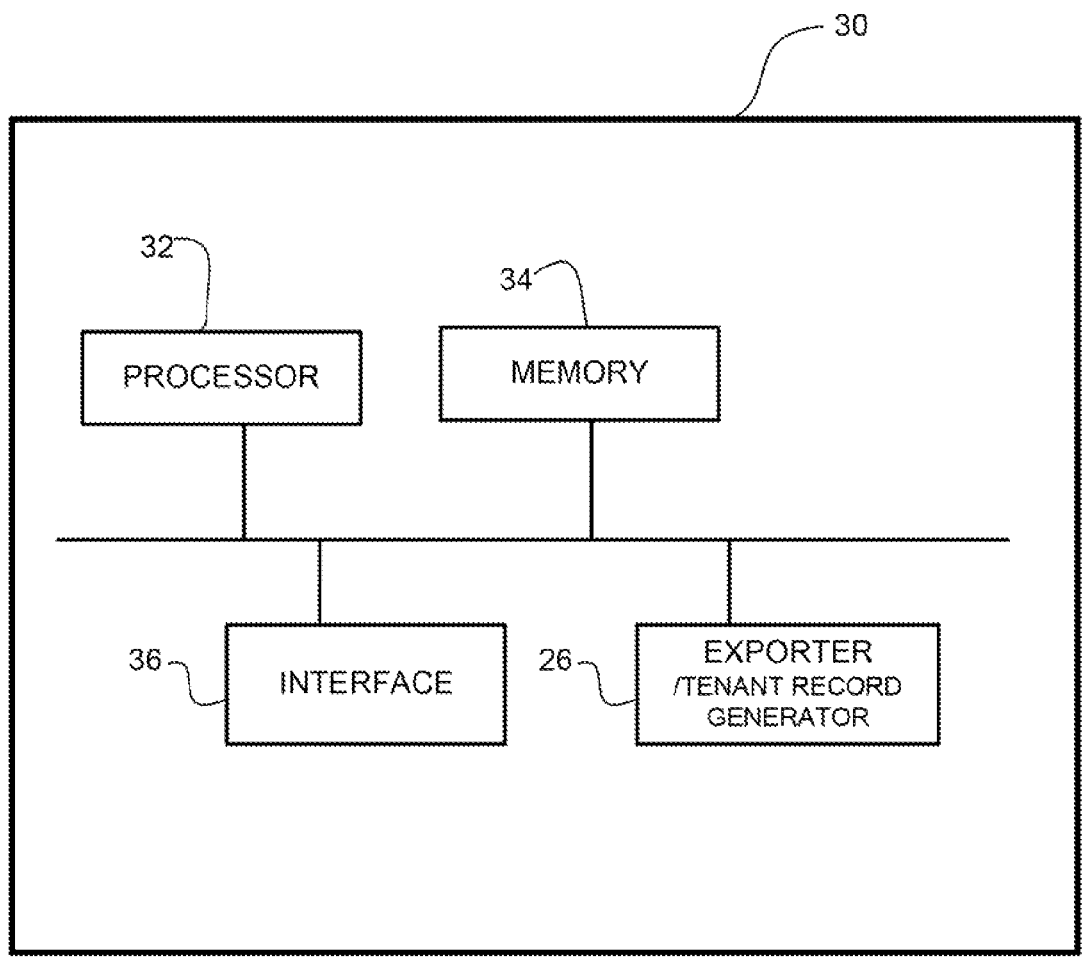
FIG. 3 depicts an example of a network device useful in implementing embodiments described herein.

FIG. 3 illustrates an example of a network device 30 (e.g., server, appliance) that may be used to implement the embodiments described herein. In one embodiment, the network device 30 is a programmable machine that may be implemented in hardware, software, or any combination thereof. The network device 30 includes one or more processor 32, memory 34, network interface 36, and exporter 26.

The exporter 26 includes a tenant record generator and data record generator (e.g., logic operable to generate the tenant record 25 and flow data record 28). The exporter 26 may comprise, for example, fixed logic or programmable logic (e.g., software/computer instructions executed by processor 32).

Memory 34 may be a volatile memory or non-volatile storage, which stores various applications, operating systems, modules, and data for execution and use by the processor 32. For example, the memory 34 may store exporter process logic.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 36 may comprise any number of interfaces (e.g., line cards, network interface cards, ports) for receiving data or transmitting data to other devices.

It is to be understood that the network device 30 shown in FIG. 3 and described above is only an example and that different configurations of network devices may be used. For example, the network device 30 may further include any suitable combination of hardware, software, algorithms, processors, devices, components, or elements operable to facilitate the capabilities described herein.

Figure 4:
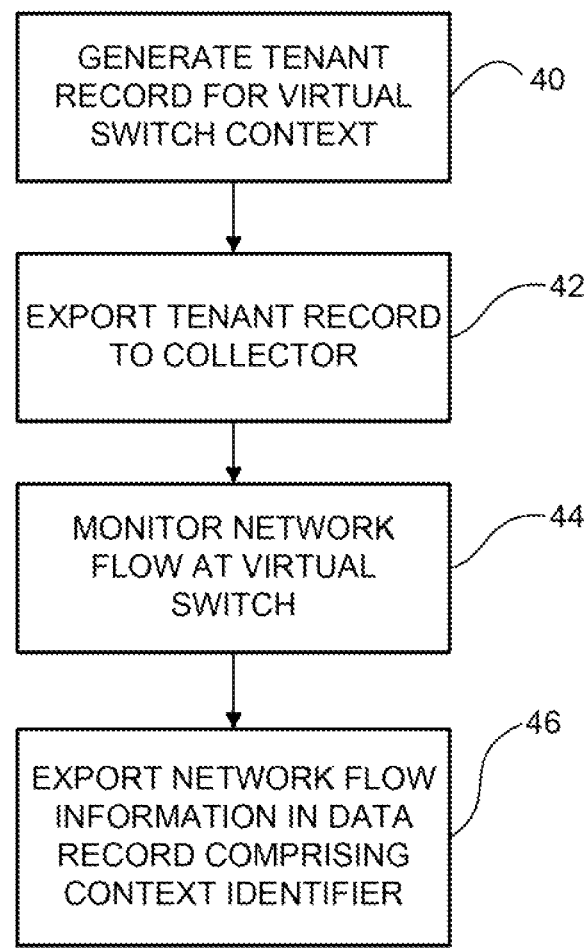
FIG. 4 is a flowchart illustrating an overview of a process for providing tenant information for network flows, in accordance with one embodiment.

FIG. 4 is a flowchart illustrating a process for providing tenant information for network flows, in accordance with one embodiment. At step 40, the exporter 26 generates a tenant record 25 for each VXLAN segment or other context defined within the virtual switch. As previously described, the tenant record 25 includes tenant specific information based on segmentation ID, for example. As described above with respect to FIG. 1, the exporter 26 operates at the distributed virtual switch and may be located at server 12 (at the virtual switch 14) or appliance 18 (at the virtual supervisor module). The tenant record 25 is exported to the collector 20 (step 42). The distributed virtual switch monitors network flow and collects network flow data for network flows passing through the network device (step 44). Monitoring may comprise, for example, monitoring network flow at the VEM 14 or collecting network flow data at the VSM 18. Since flows may both ingress and egress the network device, statistics are maintained for either ingress or egress traffic. The network device exports the network flow information in data record 28 (step 46).

The data record 28 includes an identifier associating the data record with a context. As described above, the identifier may include, for example, a segment ID, associating the data record 28 with a VXLAN segment. The tenant record 25 comprising the same segment ID provides tenant specific information for that VXLAN segment. The network flow information may be, for example, encapsulated into packets as a network flow record for transport. The data flow records 28 may be transmitted at the end of a network flow or at periodic intervals. The collector 20 uses the information received in the tenant record 25 to associate the flow data received in the data record 28 with a tenant.

It is to be understood that the process shown in FIG. 4 and described above is only an example and that steps may be added, modified, or reordered without departing from the scope of the embodiments. For example, the tenant record 25 may not be exported to the collector 20 until the network device has collected at least some network flow information, or the tenant record 25 may be transmitted with the data record 28.

Although the method, apparatus, and system have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
generating at a network device comprising a virtual switch in communication with one or more virtual machines, a tenant record comprising tenant information for a context defined within said virtual switch to map flow data to a specific tenant;
exporting the tenant record to a collector;
monitoring network flow at said virtual switch; and
exporting network flow data in a data record to the collector;
wherein the context comprises a Virtual eXtensible Local Area Network (VXLAN) segment, the data record comprising an identifier associating the data record with the VXLAN segment; and
wherein the monitoring and exporting is performed on a per tenant basis, each of the tenants comprising one or more applications operating in an on-demand service cloud computing environment with said virtual machines sharing resources, wherein said virtual machines within the same VXLAN segment can communicate with one another.

2. The method of claim 1 wherein each VXLAN segment providing a layer 2 overlay scheme over a layer 3 network.

3. The method of claim 1 wherein the tenant record comprises a network flow options template.

4. The method of claim 1 wherein the tenant record is configured for use at the collector to map the data record to the tenant associated with the context.

5. The method of claim 1 wherein the identifier comprises a virtual extensible local area network segment identifier.

6. The method of claim 1 wherein the tenant record comprises a tenant identifier.

7. The method of claim 1 wherein the tenant record comprises a location of the network device in a network.

8. The method of claim 1 wherein the virtual switch comprises a distributed virtual switch and the tenant record comprises a distributed virtual switch identifier.

9. The method of claim 1 wherein exporting the tenant record and exporting the data record comprises utilizing a NetFlow protocol.

10. An apparatus comprising:
a processor for generating a tenant record comprising tenant information for a context defined within a virtual switch in communication with one or more virtual machines, exporting the tenant record to a collector, monitoring network flow at said virtual switch, and exporting network flow data in a data record to the collector; and
memory for storing said tenant information;
wherein the context comprises a Virtual eXtensible Local Area Network (VXLAN) segment, the data record comprising an identifier associating the data record with the VXLAN segment; and
wherein the monitoring and exporting is performed on a per tenant basis, each of the tenants comprising one or more applications operating in an on-demand service cloud computing environment with multiple virtual machine sharing resources, wherein said virtual machines within the same VXLAN segment can communicate with one another.

11. The apparatus of claim 10 wherein each VXLAN segment providing a layer 2 overlay scheme over a layer 3 network.

12. The apparatus of claim 10 wherein the tenant record comprises a network flow options template.

13. The apparatus of claim 10 wherein the tenant record is configured for use at the collector to map the data record to the tenant associated with the context.

14. The apparatus of claim 10 wherein the identifier comprises a virtual extensible local area network segment identifier.

15. The apparatus of claim 10 wherein the tenant record comprises a tenant identifier.

16. The apparatus of claim 10 wherein the tenant record comprises a location in a network.

17. The apparatus of claim 10 wherein the virtual switch comprises a distributed virtual switch and the tenant record comprises a distributed virtual switch identifier.

18. The apparatus of claim 10 wherein the tenant record and data record are exported utilizing a NetFlow protocol.

19. Logic encoded on one or more non-transitory computer readable media for execution and when executed operable to:
generate at a network device comprising a virtual switch in communication with one or more virtual machines, a tenant record comprising tenant information for a context defined within said virtual switch to map flow data to a specific tenant;
export the tenant record to a collector;
monitor network flow at said virtual switch; and
export network flow data in a data record to the collector;
wherein the context comprises a Virtual eXtensible Local Area Network (VXLAN) segment, the data record comprising an identifier associating the data record with the VXLAN segment; and
wherein the monitoring and exporting is performed on a per tenant basis, each of the tenants comprising one or more applications operating in an on-demand service cloud computing environment with multiple virtual machines sharing resources, wherein said virtual machines within the same VXLAN segment can communicate with one another.

20. The logic of claim 19 wherein each VXLAN segment providing a layer 2 overlay scheme over a layer 3 network.

* * * * *